2,723,901

CATION EXCHANGE SEPARATION PROCESS

French T. Hagemann, Chicago, Ill., and Harry C. Andrews, Ames, Iowa, assignors to the United States of America as represented by the United States Atomic Energy Commission No Drawing. Application September 7, 1950, Serial No. 183,653

10 Claims. (Cl. 23—14.5)

This invention deals with the separation of actinium from aqueous solutions and in particular of actinium from a mixture also containing thorium, radium, lead, bismuth and the bivalent decay "daughters" of radium and actinium. The invention also relates to the separation of actinium from thorium and to the separation of thorium from radium, lead, bismuth and the daughters of radium and actinium which are mainly the elements having an atomic number of from 82 to 90.

It is thus an object of this invention to provide a process by which actinium may be separated from aqueous solutions with a high degree of efficiency.

Another object of this invention is to provide a process by which actinium may be produced in a high degree of purity.

These and other objects are accomplished by forming an aqueous mineral acid solution of the elements to be separated, passing the solution through a cation exchange resin whereby trivalent actinium and tetravalent thorium, if present, are completely adsorbed by the resin while radium and other bivalent ions present are only partly adsorbed. The resin is then treated with a mineral acid, preferably the same acid as that used in the starting solution and also of approximately the same concentration, whereby the "partly" adsorbed elements are washed out, and thereafter using a more concentrated solution of mineral acid whereby the actinium is eluted while the thorium remains on the resin.

The invention has a great number of applications. For instance, it may be used for the separation of actinium from uranium, radium and other elements present in uranium-containing ores, such as pitchblende, monazite sand and carnotite type ores. The process of the invention is also useful in the recovery of actinium from neutron-irradiated radium in which actinium is formed according to the following reaction:

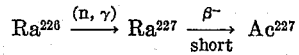
$$\text{Ra}^{226} \xrightarrow{(n, \gamma)} \text{Ra}^{227} \xrightarrow[\text{short}]{\beta^-} \text{Ac}^{227}$$

All mineral acids that form water-soluble salts with radium are usable for the process of this invention; however, nitric acid is preferred.

The acid concentration in the starting solution may range from 0.1 to 3 N, and approximately the same concentration is suitable for the first elution step of the "partly" adsorbed values. For the elution of the more intensely or "completely" adsorbed elements, such as actinium, the acid concentration should be at least 3 N. Concentrations of 2 N for the first step and of 4 N for the second step have been found to be the optimal concentrations in the case of nitric acid.

The eluates containing metal values are preferably collected in fractions; the first fraction thus obtained contains exclusively the less intensely or "partly" adsorbed values, while later fractions contain pure actinium salt. Intermediate fractions may contain a mixture and they are preferably recycled for further separation.

In one preferred operation of the process of this invention, the resin is arranged in the form of a column of such a length that only part thereof is utilized for adsorption so that the lower, unadsorbed portion of the resin is utilized for further separation of the various salts during the desorption step. In other words, the resin is preferably used in an amount greater than that required to adsorb all the salts present in the solution.

In another embodiment of this invention the resin is contacted with the solution, and the treated and more or less saturated resin is then placed above a column of untreated resin; the acid solution is then passed through both columns for elution.

In a third embodiment of the invention, a mixture of ions adsorbed on a cation exchange resin is separated by passing through this column of the resin containing the adsorbed values the eluate obtained from a previous column and then passing the eluate from the latter column through a column of fresh cation exchange resin; successive portions of the eluate are then collected from that last column which contained the fresh resin.

The preferred cation exchange resin for the process of this invention is a sulfonated synthetic organic cation exchange resin. A sulfonated phenol-formaldehyde type of resin, which may be a resin prepared from a natural-occurring phenolic material, such as tannin, or one prepared from a synthetic phenolic compound, is a suitable example of this type of sulfonated synthetic organic cation exchange resin. The sulfonated phenol-formaldehyde type of resin usually contains the sulfonic acid groups linked to the aromatic rings each through a methylene radical. Another preferred sulfonated synthetic organic cation exchange resin is a nuclear sulfonic type of synthetic organic cation exchange resin in which the sulfonic acid groups are directly attached to the aromatic nuclei in an aromatic hydrocarbon polymer.

For instance, "Amberlite IR-1," a sulfonated phenol-formaldehyde type cation exchange resin in which the phenolic compound is a natural-occurring compound, namely, tannin, and "Amberlite IR-100," a sulfonated phenolformaldehyde type resin made from a synthetic phenol, are suitable. Both of these resins are of the phenolic methylene sulfonic type of cation exchange resin. "Dowex 50" and "Nalcite NCR" are examples of the nuclear sulfonic type of synthetic organic cation exchange resin. According to the article, J. Am. Chem. Soc. 69, 2830, "Dowex 50" is "an aromatic hydrocarbon polymer of the type described by D'Alelio in U. S. Patent 2,366,007 containing nuclear sulfonic acid groups as the sole ion-active group at any pH value." According to Table I in the article, Analytical Chemistry, 21, 87, at page 89, "Nalcite NCR" and "Dowex 50" are both the nuclear sulfonic type of synthetic organic cation exchange resin.

A series of tests was run with the cation exchange resin "Dowex 50" in the acid form and with aqueous nitric acid solutions containing either a tracer amount of radium or a tracer amount of actinium. In each instance, 1 g. of resin was shaken with 5 ml. of solution. The distribution coefficient was then determined in these solutions as:

$$\frac{\text{Fraction of the element absorbed by the resin}}{\text{Fraction of the element in the aq. phase}} \times \frac{\text{volume of the aq. phase}}{\text{mass of the resin}}$$

These distribution coefficients were determined for radium and actinium using various nitric acid concentrations ranging from 0.5 to 3 N. At all nitric acid concentrations the distribution coefficient for actinium was considerably greater than that for radium showing the feasibility of their separation or purification. The distribution coefficient of each increased with decrease of acid concentration. The difference between the coefficient for actinium and that for radium increased with decrease in acidity. These results indicate that the separation of radium from actinium may be easily achieved by adsorption on a cation exchange resin and fractional elution and that separation is more complete at the lower acid concentrations all other conditions being constant.

Furthermore, a number of column operations were performed in which 100 to 200 ml. of 2 N and 3 N nitric acid solutions, respectively, containing tracer amounts of radium, actinium and the other daughter elements were passed through a 12 cm. x 1 cm.$^2$ column of acid-form "Dowex 50" resin, followed by elution with nitric acid of the same concentration. Similar runs were made with aqueous solutions also containing barium equivalent to 1 g. of radium to simulate the conditions of the separation of actinium from 1 g. of neutron-irradiated radium. In 3 N nitric acid, the radium and barium were almost completely removed from the resin before the actinium appeared in the eluate. Using 2 N nitric acid, the separation of the divalent ions from the trivalent ones was very pronounced, and there was even an 80% separation of radium from barium, the latter being washed out first. Bismuth was eluted together with the divalent ions. Polonium was not eluted in a sharp band, but almost continuously started to come off the resin after the radium was washed out and also appeared in the first fractions containing actinium. Thorium was not eluted until all of the actinium had been removed. When macro-amounts of barium were present, the breakthrough points for various elements appeared somewhat sooner than when only tracers were used.

Another set of experiments was carried out in order to demonstrate the function between the distribution coefficients and concentrations of nitric acid. The effect of high concentrations of radium upon the distribution coefficients was simulatd again by adding various amounts of barium ion to some of the solutions. The coefficients were determined by equilibrating 5 ml. of the solutions containing known amounts of Ra$^{226}$, La$^{140}$ and/or Ac$^{228}$, in tracer concentration, with 0.5 g. of 150–200 mesh particle size "Dowex 50" hydrogen-form resin, and then testing the supernatant solution for activity and calculating the distribution coefficient. The coefficients determined by these tests are compiled in Table I. La$^{140}$ was used as a convenient stand-in for actinium in the tests using solutions containing divalent barium.

lution was then passed through a column of 150- to 200-mesh "Dowex 50" resin in the acid form at a flow rate of 0.4–0.5 ml./min./cm.$^2$ of resin (~20 ml./hr.). The column consisted of a bed of resin 11.6 cm. in length and 1 cm. in diameter supported by a sintered glass disc. After all of the radium solution had passed through the column, the resin was washed with 820 ml. of 2 N nitric acid at the same flow rate for complete removal of the adsorbed radium. Elution of the adsorbed actinium was then effected by using a 4 N nitric acid eluting solution.

The first 560 ml. of eluate, which the previous tracer runs had indicated should contain essentially all of the radium, was collected in a single fraction, and the remainder of the eluate was collected in separate fractions at two-hour intervals. Aliquots of each fraction were plated and the growth and decay of the alpha activity in each sample observed. Pulse analyses of several samples were also made to establish the identity of the alpha activities. Analyses of the growth and decay curves which were followed for one and one-half months, gave the results compiled in Table II.

Table II

| Eluant | Eluate Fraction, ml. | Composition |
|---|---|---|
| 2 N HNO$_3$ | 0– 560 | 99.9+% of original radium. |
| | 560– 600 | 4μg. radium/ml.; AcX, ThX and daughters; some polonium. |
| | 600– 645 | AcX, ThX and daughters; no detectable radium or polonium. |
| | 645– 970 | same as fraction 600–645 ml. |
| | 970–1,010 | AcX, ThX and daughters; no actinium. |
| 4 N HNO$_3$ | 1,010–1,045 | 22.6% of total actinium. |
| | 1,045–1,080 | 50.8% of total actinium. |
| | 1,080–1,115 | 21.9% of total actinium. |
| | 1,115–1,150 | 4.1% of total actinium. |
| | 1,150–1,185 | 0.5% of total actinium. |
| | 1,185–1,225 | 0.1% of total actinium. |
| | 1,225–1,260 | AcX, ThX and daughters; no detectable actinium. |
| | 1,260–1,630 | same as fraction 1225–1260 ml.; no detectable RdAc or RdTh. |

All of the radium was recovered in the first 600 ml. of eluate and was obtained in the form of the nitrate by evaporation of the 2 N nitric acid solution. The next 400 ml. of eluate contained only the AcX (Ra$^{223}$) and ThX (Ra$^{224}$) activity which continually grows from the actinium and the thorium isotopes still adsorbed on the resin. After changing to 4 N nitric acid, the actinium Table I

| HNO$_3$, N | No Ba$^{++}$ | | | 5×10$^{-4}$M Ba$^{++}$ | | 5×10$^{-3}$M Ba$^{++}$ | | 5×10$^{-2}$M Ba$^{++}$ | |
|---|---|---|---|---|---|---|---|---|---|
| | Ra | Ac | La | Ra | La | Ra | La | Ra | La |
| 5 | | 15 | | | | | | | |
| 4 | | 30 | | | | | | | |
| 3 | 10 | 92 | 58 | 8 | 55 | 9 | 47 | 13 | 32 |
| 2 | 40 | 370 | 224 | 37 | 243 | 32 | 135 | 28 | 91 |
| 1.5 | 129 | | 566 | 111 | 766 | 99 | 433 | 63 | 246 |
| 1 | 390 | 00 | 2,640 | 398 | 00 | 134 | 1,080 | 143 | 581 |
| 0.5 | 1,530 | | 10,000 | 1,790 | 00 | 1,580 | 00 | 600 | 11,900 |
| 0.1 | | 00 | | | | | | | |

This table, too, shows the considerably higher adsorption of actinium as compared with that of radium and lanthanum, in particular when nitric acid of a low concentration is used.

In another instance, 0.93 g. of radium had been neutron-irradiated in the form of its chloride for 115.6 effective days in the test hole of a uranium pile. After de-emanation for several hours at 300° to 400° C. to reduce the gamma-activity level due to radon daughters, the salt was dissolved in water and nitric acid was added to give 150 ml. of a solution 2 N in nitric acid. The sostarted to elute, 95% being removed in a volume of 105 ml. and 100% in 215 ml. of acid. An additional 400 ml. of 4 N nitric acid failed to elute any of the adsorbed thorium isotopes (RdAc and RdTh).

Preliminary estimates from the alpha growth curves indicate a yield of ~1 mg. of actinium with little or no radiochemical impurity. Spectrographic analysis of an aliquot of the actinium solution containing 11 micrograms of actinium and of a blank consisting of the same volume of the 4 N nitric acid used for elution showed the following detectable chemical impurities.

Table III

| Element | Ac, μg. | Blank, μg. |
|---|---|---|
| Al | 0.3 | 0.3 |
| Ca | 0.05 | 0.05 |
| Fe | 0.05 | 0.05 |
| Pb | 0.3 | <0.05 |
| Ra | Trace (<<0.1) | None |

The process of this invention may be used for the recovery of actinium from solutions containing, in addition to actinium, radium, thorium or the daughter elements of radium and/or actinium. While the actinium, as has been illustrated above, may be recovered by eluting it from the resin, it may also be recovered, in the absence of thorium, by igniting the resin whereby pure actinium salt is obtained. The radium may be recovered from the eluates by direct evaporation of the first fractions of the effluent.

It will be understood that this invention is not to be limited to the details given herein but that it may be modified within the scope of the appended claims.

What is claimed is:

1. A process for separating radium and actinium, comprising forming a solution of said elements in mineral acid of an acid concentration up to 3 N; treating said acid solution with a cation exchange resin whereby the actinium cation is completely adsorbed whereas the radium cation is only partly adsorbed; fractionally eluting said radium with mineral acid of a concentration of 0.1 to 3 N and thereafter said actinium with mineral acid of a concentration higher than 3 N.

2. A process for separating actinium values from thorium values contained in an aqueous mineral acid solution of an acid concentration of up to 3 N, comprising passing said solution over cation exchange resin whereby both actinium and thorium are adsorbed by said resin, and fractionally eluting the adsorbed values by means of mineral acid of a concentration higher than 3 N whereby said actinium values are removed while said thorium values are retained on said resin.

3. A process for separating actinium from radium and thorium contained in an aqueous mineral acid solution of an acid concentration of 0.1 to 3 N, comprising passing said solution over cation exchange resin whereby actinium values, radium values and thorium values are adsorbed by said resin, fractionally eluting the adsorbed values by means of mineral acid of approximately the same concentration as that used in the adsorption step whereby said radium values are removed from said resin, thereafter continuing elution with an acid of a concentration above 3 N whereby said actinium values are removed while said thorium values are retained on said resin.

4. A process for separating actinium values from thorium values, radium values and their decay elements values contained in an aqueous mineral acid solution, comprising adjusting the concentration of said mineral acid to a content between 0.1 and 3 N, passing said solution over cation exchange resin whereby all of said values are adsorbed, treating said resin with a dilute mineral acid having a concentration of from 0.1 to 3 N whereby said radium values and decay elements values are removed, thereafter eluting with a mineral acid of a concentration above 3 N whereby said actinium values are eluted while said thorium values are retained on said resin.

5. The process of claim 4 wherein the mineral acid for eluting is the same type of acid as is present in the initial solution.

6. The process of claim 4 wherein the mineral acid is nitric acid.

7. The process of claim 6 wherein the concentration of nitric acid for the first elution step is 2 N and that for the second elution step is 4 N.

8. The process of claim 7 wherein the resin is a nuclear sulfonic type of synthetic organic cation exchange resin.

9. A process for separating radium, actinium and thorium values from each other, comprising forming a solution of said elements in mineral acid to obtain an acid concentration of a maximum of 3 N; treating said acid solution with a cation exchange resin whereby the actinium and thorium values are completely adsorbed while the radium values are only partly adsorbed; eluting said adsorbed values with mineral acid first of a concentration of from 0.1 to 3 N and separately collecting the various fractions whereby at least one first fraction is obtained containing radium values only, at least one intermediate fraction containing radium and actinium values, and, using mineral acid of a concentration of above 3 N, at least one final fraction containing actinium values only; and recycling said intermediate fractions for further separation.

10. A process for separating thorium values from radium values and its decay elements values contained in an aqueous mineral acid solution of an acid concentration up to 3 N, comprising passing said solution over cation exchange resin whereby all of said values are adsorbed, treating said resin with a dilute mineral acid of a concentration between 0.1 and 3 N whereby said radium and decay elements values are removed while said thorium values are retained by said resin.

References Cited in the file of this patent

Cohn et al.: Journal of the American Chemical Society, volume 70, page 1986 (1948).

Tompkins et al.: Journal of the American Chemical Society, volume 69, pages 2769–2777 (1947).

Sussman et al.: Industrial and Engineering Chemistry, volume 37, pages 618–624 (1945).